United States Patent
Zaitman et al.

(10) Patent No.: US 12,411,776 B2
(45) Date of Patent: Sep. 9, 2025

(54) DATA STORAGE SYSTEM WITH STREAMLINED DEDUPLICATION DURING WRITE LOG FLUSHING

(71) Applicant: Dell Products L.P., Round Rock, TX (US)

(72) Inventors: Amit Zaitman, Shavey Shomron (IL); Uri Shabi, Tel Mond (IL); Geng Han, Beijing (CN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/403,290

(22) Filed: Jan. 3, 2024

(65) Prior Publication Data
US 2025/0217303 A1 Jul. 3, 2025

(51) Int. Cl.
*G06F 12/00* (2006.01)
*G06F 12/12* (2016.01)

(52) U.S. Cl.
CPC .................... *G06F 12/12* (2013.01)

(58) Field of Classification Search
CPC .............. G06F 12/12; G06F 11/1453
See application file for complete search history.

(56) References Cited

U.S. PATENT DOCUMENTS

| | | |
|---|---|---|
| 8,380,681 B2 | 2/2013 | Oltean et al. |
| 9,135,123 B1* | 9/2015 | Armangau ............ G06F 16/172 |
| 9,633,056 B2 | 4/2017 | Attarde et al. |
| 10,915,260 B1* | 2/2021 | Lei ........................ G06F 3/0671 |
| 10,956,346 B1 | 3/2021 | Ben-Yehuda et al. |
| 11,194,495 B2 | 12/2021 | Dalmatov |
| 2013/0275656 A1* | 10/2013 | Talagala .............. G06F 12/0246 711/103 |
| 2016/0344834 A1* | 11/2016 | Das ....................... H04L 67/1097 |
| 2018/0253255 A1* | 9/2018 | Jain ....................... G06F 3/0673 |
| 2019/0034282 A1* | 1/2019 | Ugale ................ G06F 12/0833 |

(Continued)

FOREIGN PATENT DOCUMENTS

WO WO-2018231476 A1 * 12/2018 ......... G06F 12/0868

OTHER PUBLICATIONS https://web.archive.org/web/20231205171713/https://en.wikipedia.org/wiki/Data_deduplication (Year: 2023).*

*Primary Examiner* — Tim T Vo
*Assistant Examiner* — Mohammad S Hasan
(74) *Attorney, Agent, or Firm* — BainwoodHuang (57) ABSTRACT

A method of data deduplication during log flushing includes use of an in-memory deduplication index as a cached sub-set of entries from a full on-drive deduplication index. In a pre-flush process, the data is scanned and the on-drive index is accessed to identify matching deduplication entries, and identified entries are copied into the in-memory index. The subsequent flush includes, for each data unit, (1) accessing the in-memory index to identify a matching deduplication entry for the data unit, (2) upon identifying a matching entry, storing the data unit in a deduplicated manner as a reference to previously stored data, and (3) upon not identifying a matching entry, storing the data unit in a non-deduplicated manner including a new data instance, without accessing the on-drive index. Performance and efficiency are improved by accessing only the in-memory index and avoiding the penalties of accessing the on-drive index.

20 Claims, 5 Drawing Sheets

(56) References Cited

U.S. PATENT DOCUMENTS

| | | | |
|---|---|---|---|
| 2022/0206713 A1* | 6/2022 | Kim | G06F 3/0656 |
| 2022/0334966 A1* | 10/2022 | Chen | G06F 12/0868 |
| 2024/0295968 A1* | 9/2024 | Sugimoto | G06F 3/0619 |

* cited by examiner

DATA STORAGE SYSTEM WITH STREAMLINED DEDUPLICATION DURING WRITE LOG FLUSHING

BACKGROUND

The invention is related to the field of data storage systems, and in particular to data storage systems employing write log flushing accompanied by data deduplication.

SUMMARY

A method of deduplication of data in conjunction with flushing the data from an in-memory log to persistent secondary storage includes maintaining an in-memory deduplication index as a cached sub-set of entries from a full on-drive deduplication index in the persistent secondary storage. Prior to performing a flush process for the data, the data is scanned in the in-memory log and the on-drive deduplication index is accessed to identify deduplication entries representing opportunities to deduplicate corresponding data units of the data, and identified deduplication entries are copied into the in-memory deduplication index. Subsequently the flush process is performed for the data including, for each data unit being flushed, (1) accessing the in-memory deduplication index to identify a matching deduplication entry for the data unit, (2) upon identifying a matching deduplication entry, storing the data unit in a deduplicated manner with a reference to previously stored data of the matching deduplication entry, and (3) upon not identifying a matching deduplication entry, storing the data unit in a non-deduplicated manner including a new instance of unique data, without accessing the on-drive deduplication index for the data unit. The technique can improve performance and efficiency by streamlining the flush process based on accessing only the in-memory deduplication index and avoiding the penalties of accessing the on-drive index.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

A technique is disclosed for improving the efficiency of deduplication and reducing complexity of the flush process in data storage systems, in which a portion of the deduplication process is performed in a pre-flushing stage before initiation of a data flushing process. The technique involves opportunistically promoting selected fingerprints from an on-drive deduplication ("dedupe") index to an in-memory dedupe index during the pre-flush stage. Consequently, the dedupe process that takes place during the flush process can be confined solely to the in-memory dedupe index. This approach significantly reduces the need for slower disk I/O operations, optimizes CPU utilization and flush latency, enhances system performance by potential increased parallelism, and manages system resources efficiently.

The flush process is an important operation in a data storage system. It involves migrating data from an initial short-term memory storage (write log), where it is written and committed in response to a request from the host system to long-term storage located on system drives (e.g., Flash memory or magnetic media). The flush process is crucial for determining system performance, as its effectiveness directly influences system throughput and impacts the speed of servicing host system requests.

In the present context, one component of the flush process is "deduplication," which is a method that identifies and eliminates redundant data to improve storage efficiency. The deduplication process involves a lookup in deduplication (dedupe) indexes, which are data structures that contain fingerprints of stored data. There are two types of dedupe indexes: an in-memory dedupe index, which is a smaller, faster, memory-based index, and a larger (complete), but slower, on-drive dedupe index.

Conventionally, the dedupe lookup process occurs during the flush process. The system first searches the in-memory dedupe index, and if no match is found, the lookup continues in the on-drive dedupe indexes. This approach is effective and straightforward, and it has benefits of inherent synchronization of the deduplication and flushing operations for individual units of data. However, this approach does have a drawback: because drive reads are significantly slower than memory access, there is a potential drop in CPU utilization during the flush process as the CPU waits for the drive I/O operations to finish. This wait time can degrade the system's performance. The disclosed technique aims to limit the reliance on slower drive reads during the actual flush process.

The disclosed approach maintains beneficial aspects of conventional flush operation while avoiding the penalty of inline lookups to the on-drive index. The technique transitions the drive-involved dedupe lookups to a pre-flush stage, thereby avoiding these high-cost operations during the flush. During the pre-flush stage, the system scans the write log and for dedupe opportunities in the on-drive dedupe indexes. If a match is found, the corresponding fingerprint is promoted (copied) to the in-memory dedupe index, where it can be efficiently located via in-memory lookup at the data flush time. The subsequent flush processes accesses only the in-memory index, avoiding the above-described wait time penalties associated with accessing the on-drive index.

This method efficiently uses the in-memory dedupe index's functionality, which can hold 'warm' data fingerprints that are likely to be looked up soon, in addition to its primary function of storing new data fingerprints that will later move to the on-drive dedupe indexes. With this approach, the dedupe lookup during the flush is confined solely to the in-memory dedupe index. The deduplication process continues to be part of the flush process, avoiding synchronization issues or any need for additional memory to store scanner results. The technique effectively utilizes CPU resources, reduces reliance on slower disk I/O operations during the flush, and manages system resources without additional memory consumption. Overall, it can offer substantial improvements in efficiency and performance for data storage operations.

Embodiments

Figure 1:
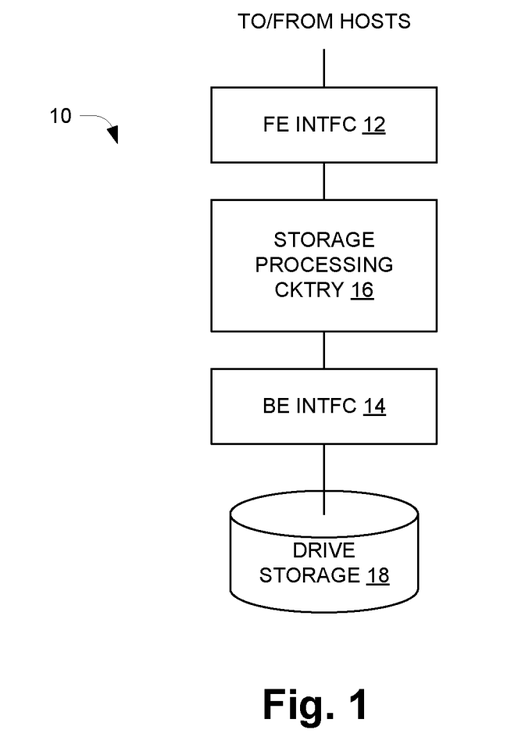
FIG. 1 is a block diagram of a data storage system from a hardware perspective.

FIG. 1 shows a data storage system 10 that provides secondary storage of data for host computers (hosts). It includes a front-end interface (FE INTFC) 12, back-end interface (BE INTFC) 14, storage processing circuitry 16, and a collection of data storage devices (e.g., Flash memory, magnetic disk drives, etc.) shown as drive storage 18. The front-end interface 12 and back-end interface 14 provide connections to storage-oriented interconnects to the hosts and drive storage 18 respectively, such as iSCSI, FibreChannel, etc. The storage processing circuitry 16 is specialized computer processing circuitry including memory, processors, and high-speed interconnect as generally known in the art. The processors execute specialized data storage software the implements a variety of storage functionalities, also as generally known in the art. The present description is focused on certain functionality including the use of a write log and associated operations, namely flushing log-resident data out to drive storage 18 and use of so-called data deduplication (or "dedupe") to improve storage efficiency by removing redundant storage of identical copies of data.

Figure 2:
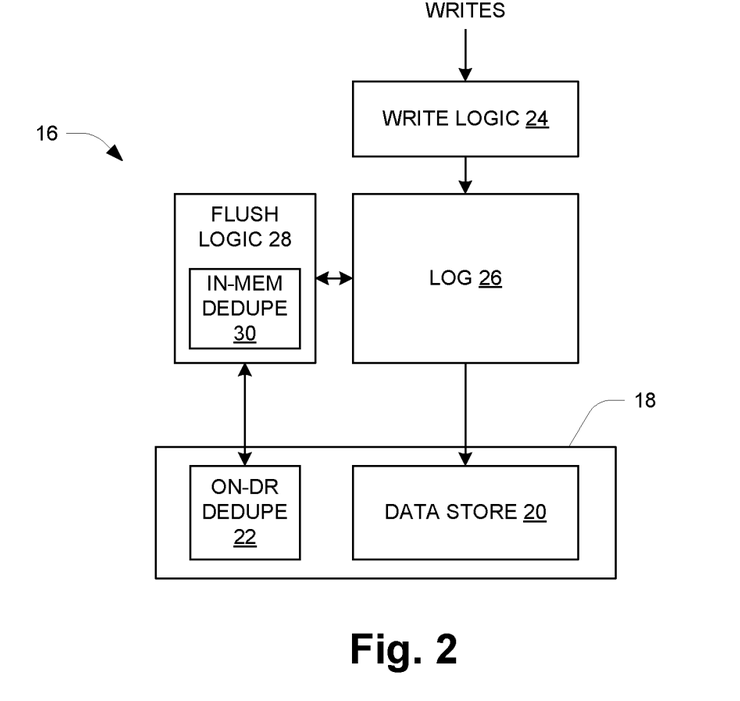
FIG. 2 is a functional block diagram of write log and flushing related components of the data storage system.

FIG. 2 is a functional block diagram of pertinent functional components. These include a data store 20 and an on-drive deduplication index (ON-DR DEDUPE) 22 on the drive storage 18. The storage processing circuitry 16 executing the data storage software implements write logic 24, a write log 26 and flush logic 28 which includes an in-memory deduplication index (IN-MEM DEDUPE) 30. In operation, data write operations (WRITES) are processed by the write logic 24, with write data being stored in the write log initially. Write log 26 is non-volatile (e.g., Flash-based) which enables the system to acknowledge host writes immediately, providing performance benefits. There are a variety of other transactions, including many types generated internally within the data storage system 10, that are included in the broad category of "writes" that operate on the log 26, including for example deallocation operations that mark units of storage no longer in use and thus available for use in storing other data.

Flush logic 28 is broadly responsible for managing the flushing of data stored in log 26 out to the backing data store 20, as necessary. Flushing may be initiated in various ways, including for example monitoring the level of occupancy of log 26 and initiating a flush when it reaches some predetermined high threshold (e.g., 75% for example). Basic flush operation is to traverse log 26 to find all stored data and write that data out to the data store 20, marking each unit of storage as free or available as its data is successfully written. In connection with the flushing, the flush logic 28 also performs data deduplication using both the in-memory deduplication index 30 and the on-drive data deduplication index 22.

Figure 3:
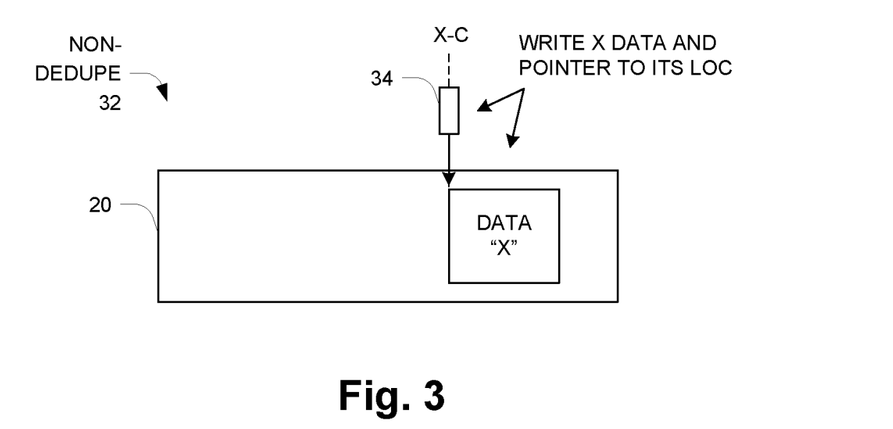
FIG. 3 is a schematic diagram illustrating storage of a data unit in a non-deduplicating manner.
Figure 4:
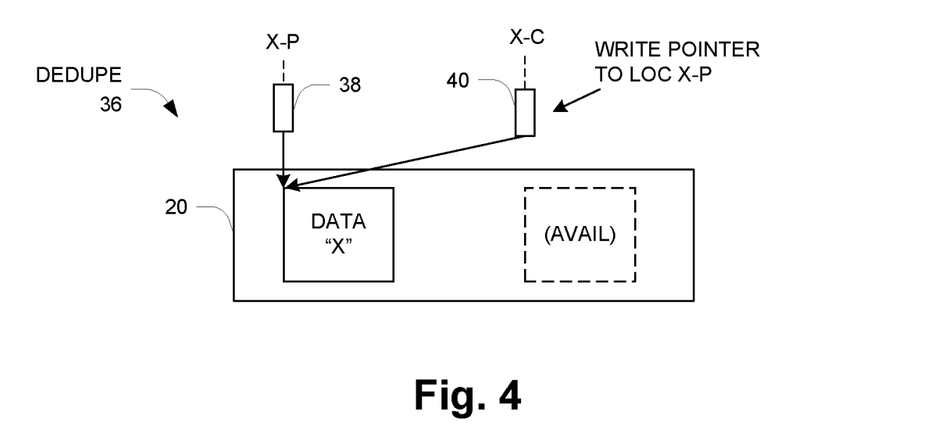
FIG. 4 is a schematic diagram illustrating storage of a data unit in a deduplicating manner.

FIGS. 3 and 4 provide simple illustrations of data deduplication. When a data value X is being written to a location X-C (for "current"), the flush logic 28 consults the dedupe indexes 30, 22 as needed to search for a match. The indexes 30, 22 store digests or "fingerprints" of stored data, and the search involves comparing a fingerprint of X to the stored fingerprints. FIG. 3 illustrates the "no-hit" or "non-dedupe" case 32, i.e., when no matching fingerprint is found. In this case, flush logic 28 writes the data X to the store 20 and stores a pointer 34 that points to the location of the newly stored instance of data X. Pointer 34 is stored at location X-C in the pointer structure, while the data is stored at an available location in the store 20 which is separately addressed.

FIG. 4 illustrates the "hit" or "dedupe" case 36, i.e., when a matching fingerprint is found. In this case it is assumed that the same data X was previously written at some other location X-P ("previous") along with a corresponding pointer 38, whose value is returned by the index lookup. In this case the flush logic 28 does not store a new copy of "X", but rather just creates a new pointer 40 at location X-C that points to the existing instance of X as identified in the matching index entry (value of pointer 38). The space that would have been consumed if X had been written again is shown in FIG. 4 as available (AVAIL) for storing other data.

Regarding the index lookups, generally this is a two-step process. First, the in-memory index 22 is examined, and if a match is found then it is used. If no match is found, then the complete on-drive index 22 is examined, and if a match is found then it is used. If no match is found, at this second step, then the data is stored in the non-deduplicated manner as described above.

As outlined above, in prior systems, flush logic performs deduplication index lookups in-line as data units are flushed, which has a negative performance impact related to accessing the on-drive index when no matches are found in the in-memory index. The present technique is directed to avoiding or reducing this negative performance aspect of flushing.

Figure 5:
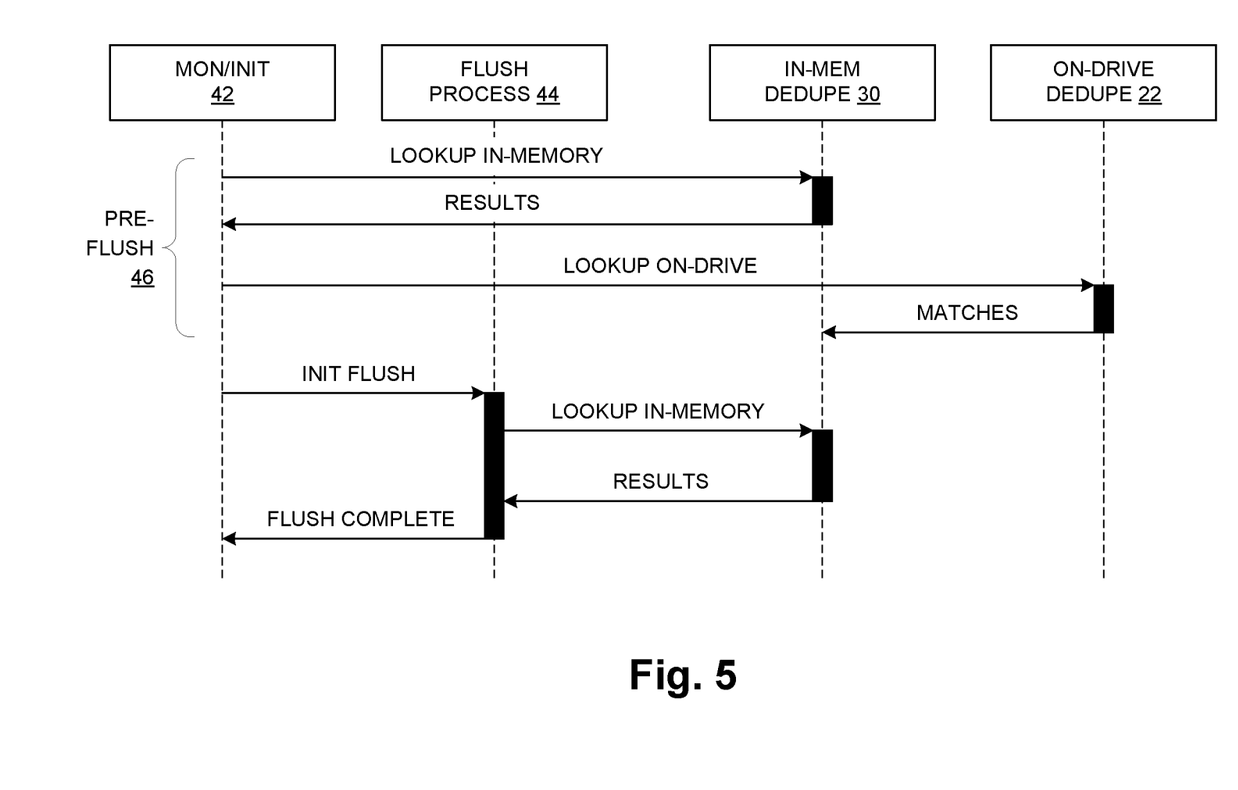
FIG. 5 is a schematic diagram of pre-flushing and flushing operations.

FIG. 5 illustrates flush and deduplication operation, which involves a monitor/initiator 42, flush process 44, and the two indexes 30, 22. Both the monitor/initiator 42 and flush process 44 are implemented by flush logic 28 (FIG. 2). The monitor/initiator 42 detects the need to initiate flushing, as outlined above. Before doing so, it performs a pre-flush process 46 of scanning the contents of log 26 and accessing the in-memory index 30 and, as necessary, the on-drive index 22 for matches, which represent opportunities for deduplication. Matching entries in the on-drive index 22 are "promoted" (copied) to the in-memory deduplication index 30. Thus, at this point the in-memory deduplication index 30 stores not only newer entries from recent writes that will eventually be copied to the on-drive index 22, but also additional entries that have been retrieved from the on-drive index 22 for use in the upcoming flush process.

The monitor/initiator 42 then initiates the flush process 44. This process traverses all the data units residing in log 26 and flushes (writes) them to the storage 20 with deduplication, as generally described above. For each data unit, the flush process accesses the in-memory deduplication index 30 and deduplicates or not, based on whether a matching fingerprint is found. Importantly, the flush process 44 accesses only the in-memory deduplication index 30, avoiding the much slower accesses to the on-drive deduplication index 22. It can do so without sacrificing deduplication efficiency due to the pre-loading of matching entries from the on-drive deduplication index 22 in the pre-flushing operation 46 as described above. The absence of a "hit" in the in-memory index 30 means with a very high confidence that there is also no match in the complete, on-drive index 22.

Figure 6:
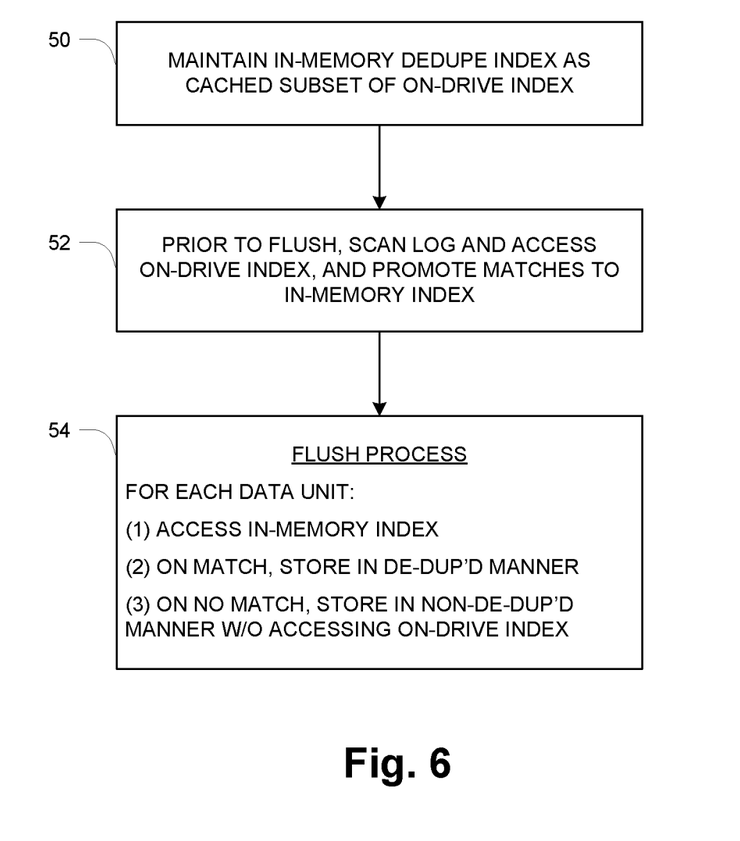
FIG. 6 is a flow diagram of flushing with streamlined deduplication accessing only and in-memory deduplication index.

FIG. 6 is a high-level flow diagram for the above-outlined operations. At 50, the system maintains an in-memory deduplication index (e.g., 30) as a cached subset of an on-drive deduplication index (e.g., 22). At 52, prior to initiating a flush, the write log (e.g., 26) is scanned and the on-drive index is accessed to identify matches which represent deduplication opportunities. These matches are promoted (copied) to the in-memory index. Then at 50 the flush process is initiated. It includes, for each data unit, (1) accessing the in-memory deduplication index to identify a matching deduplication entry for the data unit, (2) upon identifying a matching deduplication entry, storing the data unit in a deduplicated manner with a reference to previously stored data of the matching deduplication entry, and (3) upon not identifying a matching deduplication entry, storing the data unit in a non-deduplicated manner including a new instance of unique data, without accessing the on-drive deduplication index for the data unit. Examples of storing in a deduplicated or non-deduplicated manner are described above with reference to FIGS. 4 and 3, respectively. Due to this streamlining of the index lookups, the flush process proceeds much more quickly and efficiently.

While various embodiments of the invention have been particularly shown and described, it will be understood by those skilled in the art that various changes in form and details may be made therein without departing from the scope of the invention as defined by the appended claims.

What is claimed is:

1. A method of deduplication of data in conjunction with flushing the data from an in-memory log to persistent secondary storage of a data storage system, comprising:
   maintaining an in-memory deduplication index as a cached sub-set of entries from a full on-drive deduplication index in the persistent secondary storage;
   prior to performing a flush process for the data, scanning the data in the in-memory log, and accessing the on-drive deduplication index to identify deduplication entries representing opportunities to deduplicate corresponding data units of the data, and copying the identified deduplication entries into the in-memory deduplication index; and
   subsequently performing the flush process for the data including, for each data unit being flushed, (1) accessing the in-memory deduplication index to identify a matching deduplication entry for the data unit, (2) upon identifying a matching deduplication entry, storing the data unit in a deduplicated manner with a reference to previously stored data of the matching deduplication entry, and (3) upon not identifying a matching deduplication entry, storing the data unit in a non-deduplicated manner including a new instance of unique data, without accessing the on-drive deduplication index for the data unit.

2. The method according to claim 1, wherein the identified deduplication entries as copied into the in-memory deduplication index include data fingerprints likely to be looked up during the flush process, and the in-memory deduplication index also stores new deduplication entries resulting from recent deduplication operations that will later be moved to the on-drive deduplication index.

3. The method according to claim 1, wherein the in-memory log is a non-volatile log used to store writes from a host computer and enabling the immediate acknowledgment of host writes, prior to the write data later being flushed to the persistent secondary storage in the flush process.

4. The method according to claim 3, wherein the writes include the host writes as well as other types of transactions, including types generated internally within the data storage system, which operate on the log.

5. The method according to claim 4, wherein the other types of transactions include deallocation operations that mark units of storage no longer in use and thus available for use in storing other data.

6. The method according to claim 1, wherein the scanning and accessing are part of a pre-flush process performed prior to the flush process in a flush cycle initiated by a flush initiation event.

7. The method according to claim 6, wherein the flush initiation event includes the level of occupancy of the log reaches a predetermined high threshold.

8. The method according to claim 1, wherein storing the data unit in the non-deduplicated manner includes writing the data unit to the persistent secondary storage and storing a pointer pointing to the location of the newly stored instance of the data unit, the pointer being stored at a location associated with the data unit.

9. The method according to claim 1, wherein storing the data unit in the deduplicated manner includes storing a new pointer pointing to a previously written data unit having the same data as the data unit, the previously written data unit having a corresponding stored pointer whose value is returned by the index lookup, the new pointer being created by including the value from the stored pointer such that an access of the data unit results in accessing the previously written data unit.

10. A data storage system having storage processing circuitry and secondary drive storage, the storage processing circuitry including non-volatile memory configured to store an in-memory log, the storage processing circuitry executing computer program instructions of a data storage system application configured and operative for deduplication of data in conjunction with flushing the data from the in-memory log to the secondary drive storage, the deduplication including:
   maintaining an in-memory deduplication index as a cached sub-set of entries from a full on-drive deduplication index in the persistent secondary storage;
   prior to performing a flush process for the data, scanning the data in the in-memory log, and accessing the on-drive deduplication index to identify deduplication entries representing opportunities to deduplicate corresponding data units of the data, and copying the identified deduplication entries into the in-memory deduplication index; and
   subsequently performing the flush process for the data including, for each data unit being flushed, (1) accessing the in-memory deduplication index to identify a matching deduplication entry for the data unit, (2) upon identifying a matching deduplication entry, storing the data unit in a deduplicated manner with a reference to previously stored data of the matching deduplication entry, and (3) upon not identifying a matching deduplication entry, storing the data unit in a non-deduplicated manner including a new instance of unique data, without accessing the on-drive deduplication index for the data unit.

11. The data storage system according to claim 10, wherein the identified deduplication entries as copied into the in-memory deduplication index include data fingerprints likely to be looked up during the flush process, and the in-memory deduplication index also stores new deduplication entries resulting from recent deduplication operations that will later be moved to the on-drive deduplication index.

12. The data storage system according to claim 10, wherein the in-memory log is used to store writes from a host computer and enabling the immediate acknowledgment of host writes, prior to the write data later being flushed to the persistent secondary storage in the flush process.

13. The data storage system according to claim 12, wherein the writes include the host writes as well as other types of transactions, including types generated internally within the data storage system, which operate on the log.

14. The data storage system according to claim 13, wherein the other types of transactions include deallocation operations that mark units of storage no longer in use and thus available for use in storing other data.

15. The data storage system according to claim 10, wherein the scanning and accessing are part of a pre-flush process performed prior to the flush process in a flush cycle initiated by a flush initiation event.

16. The data storage system according to claim 15, wherein the flush initiation event includes the level of occupancy of the log reaches a predetermined high threshold.

17. The data storage system according to claim 10, wherein storing the data unit in the non-deduplicated manner includes writing the data unit to the persistent secondary storage and storing a pointer pointing to the location of the newly stored instance of the data unit, the pointer being stored at a location associated with the data unit.

18. The data storage system according to claim 10, wherein storing the data unit in the deduplicated manner includes storing a new pointer pointing to a previously written data unit having the same data as the data unit, the previously written data unit having a corresponding stored pointer whose value is returned by the index lookup, the new pointer being created by including the value from the stored pointer such that an access of the data unit results in accessing the previously written data unit.

19. The method of claim 1, wherein:
the in-memory log is a non-volatile log used to store writes from a host computer and enabling the immediate acknowledgment of host writes;
the scanning, accessing and copying are part of a pre-flush process performed as preparation for the flush process; and
the data subject to the pre-flush process and the flush process is data of multiple writes from the host computer stored in the in-memory log since a preceding flush process.

20. The method of claim 19, wherein the pre-flush process and flush process are performed in a flush cycle initiated by a flush initiation event which includes a level of occupancy of the in-memory log, with the data of the multiple writes from the host computer, reaching a predetermined high threshold.

* * * * *